(12) United States Patent  
Takeda

(10) Patent No.: US 7,733,401 B2  
(45) Date of Patent: Jun. 8, 2010

(54) IMAGE CAPTURING APPARATUS

(75) Inventor: Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1105 days.

(21) Appl. No.: 11/198,757

(22) Filed: Aug. 5, 2005

(65) Prior Publication Data

US 2006/0028568 A1 Feb. 9, 2006

(30) Foreign Application Priority Data

Aug. 6, 2004 (JP) ............... 2004-231427

(51) Int. Cl.
*H04N 3/14* (2006.01)
*H04N 5/335* (2006.01)
*H01L 27/00* (2006.01)

(52) U.S. Cl. .................... 348/308; 250/208.1
(58) Field of Classification Search ......... 348/308; 250/208.1
See application file for complete search history.

(56) References Cited

U.S. PATENT DOCUMENTS

| 5,008,758 | A | * | 4/1991 | Burke ............... 348/243 |
| 6,091,793 | A | * | 7/2000 | Kamashita ............ 377/60 |
| 6,380,530 | B1 | * | 4/2002 | Afghahi .............. 250/208.1 |
| 2002/0024605 | A1 | * | 2/2002 | Merrill et al. ........ 348/296 |
| 2004/0212704 | A1 | * | 10/2004 | Bell et al. ............ 348/241 |
| 2005/0128327 | A1 | * | 6/2005 | Bencuya et al. ....... 348/308 |
| 2006/0028568 | A1 | * | 2/2006 | Takeda ............... 348/294 |

FOREIGN PATENT DOCUMENTS

JP 11-177076 7/1999
JP 2002-320119 A 10/2002

OTHER PUBLICATIONS

Mendis et al.; "CMOS Active Pixel Image Sensor"; *IEEE Transactions on Electron Devices*; vol. 41, No. 3; Mar. 1994; (pp. 452-453). The above reference was cited in a Nov. 2, 2009 Japanese Office Action that issued in Japanese Patent Application No. 2004-231427, a copy of which is enclosed without English Translation.

* cited by examiner

*Primary Examiner*—Lin Ye
*Assistant Examiner*—Temitope Adeyiga
(74) *Attorney, Agent, or Firm*—Cowan, Liebowitz & Latman, P.C.

(57) ABSTRACT

An object of the present invention is to eliminate the influences of the leakage etc. of charges from a photodiode to a storage part during the electronic shutter operation. To achieve this object, the present invention includes: a photodiode which generates and accumulates a signal charge according to the amount of light from an object; an amplification part which amplifies a signal charge outputted from the photodiode and outputs the amplified signal to the outside; a storage part which temporarily stores the signal charge; and a transfer device which transfers the signal outputted from the photo-electric conversion device to the storage part via the amplification part.

6 Claims, 9 Drawing Sheets

FIG. 7A
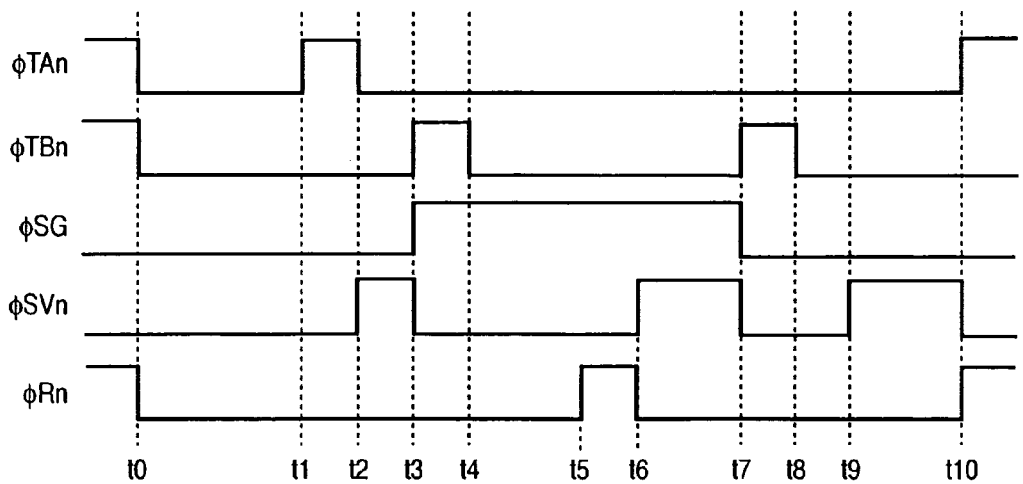
FIG. 7B  FIG. 7C  FIG. 7D
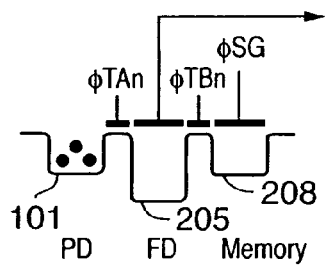 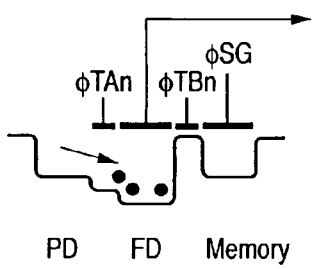 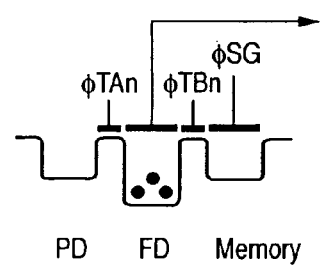
FIG. 7E  FIG. 7F  FIG. 7G
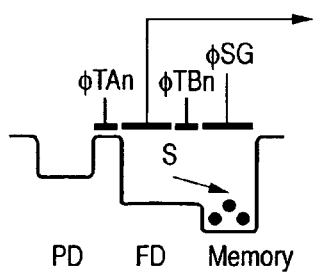 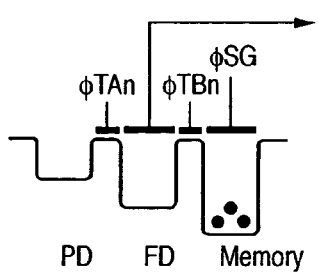 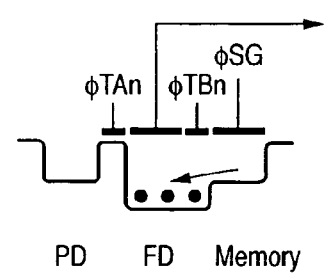
FIG. 7H
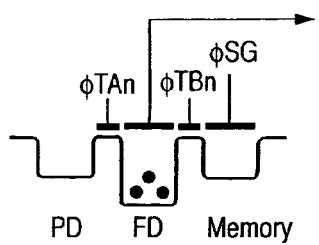

PRIOR ART

IMAGE CAPTURING APPARATUS

FIELD OF THE INVENTION

The present invention relates to an exposure time control technique based on an electronic shutter operation using a solid state image sensor.

BACKGROUND OF THE INVENTION

As an XY address type image sensor, there has hitherto be known the CMOS image sensor disclosed in IEEE TRANSACTIONS ON ELECTRON DEVICE VOL41, PP452-453, 1994, and so on. This image sensor has many advantages, such as high S/N ratio, low power consumption and on-chip peripheral circuitry. With this sensor, however, it is difficult to perform a simultaneous electronic shutter operation for all pixels as employed in interline type CCD image sensors, due to such reasons as the usage voltage being limited, or the number of elements constituting one pixel being large.

To overcome this drawback, there has been proposed, for example, a configuration of the image sensor described in Japanese Patent Laid-Open No. 11-177076. In this conventional CMOS image sensor, in order to implement a simultaneous electronic shutter function for all pixels, a storage part for temporarily storing charges is provided between a photo-electric conversion part and amplifier, and a first transfer part is provided between the photo-electric conversion part and storage part, and a second transfer part between the storage part and amplifier.

FIG. 9 illustrates a one-pixel configuration of the conventional CMOS image sensor.

Referring to FIG. 9, a first transfer part 1$a$, second transfer part 1$b$ and reset part 1$c$ are all turned on, and charges of a photodiode PD are reset. The accumulation operation of the image sensor is initiated by turning off the first transfer part 1$a$. Specifically, at this timing, the photodiode PD generates and accumulates charges according to an object image formed by an optical system (not shown). At the time when a predetermined accumulation time has elapsed, the first transfer part 1$a$ is turned on to transfer the charges accumulated in the photodiode PD to a storage part 1$e$. In advance of this operation, the second transfer part 1$b$ has been turned off. After the transfer is terminated, the first transfer part 1$a$ is turned off. By performing the on and off operation of the first transfer part 1$a$ simultaneously for the entire screen, the exposure state of the image sensor is terminated, i.e., an electronic shutter operation is implemented. Subsequently, the charges accumulated in the storage part 1$e$ are read sequentially. By turning off the reset part 1$c$ and turning on the second transfer part 1$b$, the charges of the storage part 1$e$ are transferred to an amplifier JFET and read out to the outside after amplification.

In solid state image sensors like the above-described conventional example, however, the photodiode PD and storage part 1$e$ are disposed adjacent to each other. Therefore, while the charges are being held in the storage part 1$e$, i.e., during a time period from when the charges of the photodiode PD are transferred to the storage part 1$e$ to when the charges are outputted via the amplifier JFET, unwanted charges may leak from the photodiode PD, or the storage part 1$e$ may be directly exposed to light to generate unwanted charges. Also, even when the electronic shutter operation is not needed, the charges must be transferred via the first transfer part 1$a$, storage part 1$e$ and second transfer part 1$b$, thus making the operation complex.

SUMMARY OF THE INVENTION

An object of the present invention is to eliminate the influences of the leakage etc. of charges from a photodiode to a storage part during the electronic shutter operation.

Another object of the present invention is to enable simplification of the drive when the electronic shutter operation is not performed.

To achieve the objects, according to a first aspect of the present invention, there is provided An image capturing apparatus comprising:

a plurality of pixels arranged in a two-dimensional manner, each of the plurality of pixels including a photo-electric conversion device which generates and accumulates a signal according to the amount of light from an object, an amplification device which amplifies a signal outputted from the photo-electric conversion device and outputs the amplified signal to the outside of the pixel, a storage device which temporarily stores the signal, and a transfer device which transfers the signal outputted from the photo-electric conversion device to the storage device via an input part of the amplification device and transfers the signal of the storage device to the input part of the amplification device; and a drive circuit which transfers a signal of the photo-electric conversion device of each of the plurality of pixels arranged in a two-dimensional manner to the corresponding storage device before a signal is read from a pixel from which a signal is first read.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 7A to 7H are diagrams showing drive timing and potential of an image sensor according to a fourth embodiment;

DETAILED DESCRIPTION OF THE PREFERRED EMBODIMENTS

Preferred embodiments of the present invention will be described in detail below with reference to the accompanying drawings.

First Embodiment

Figure 1:
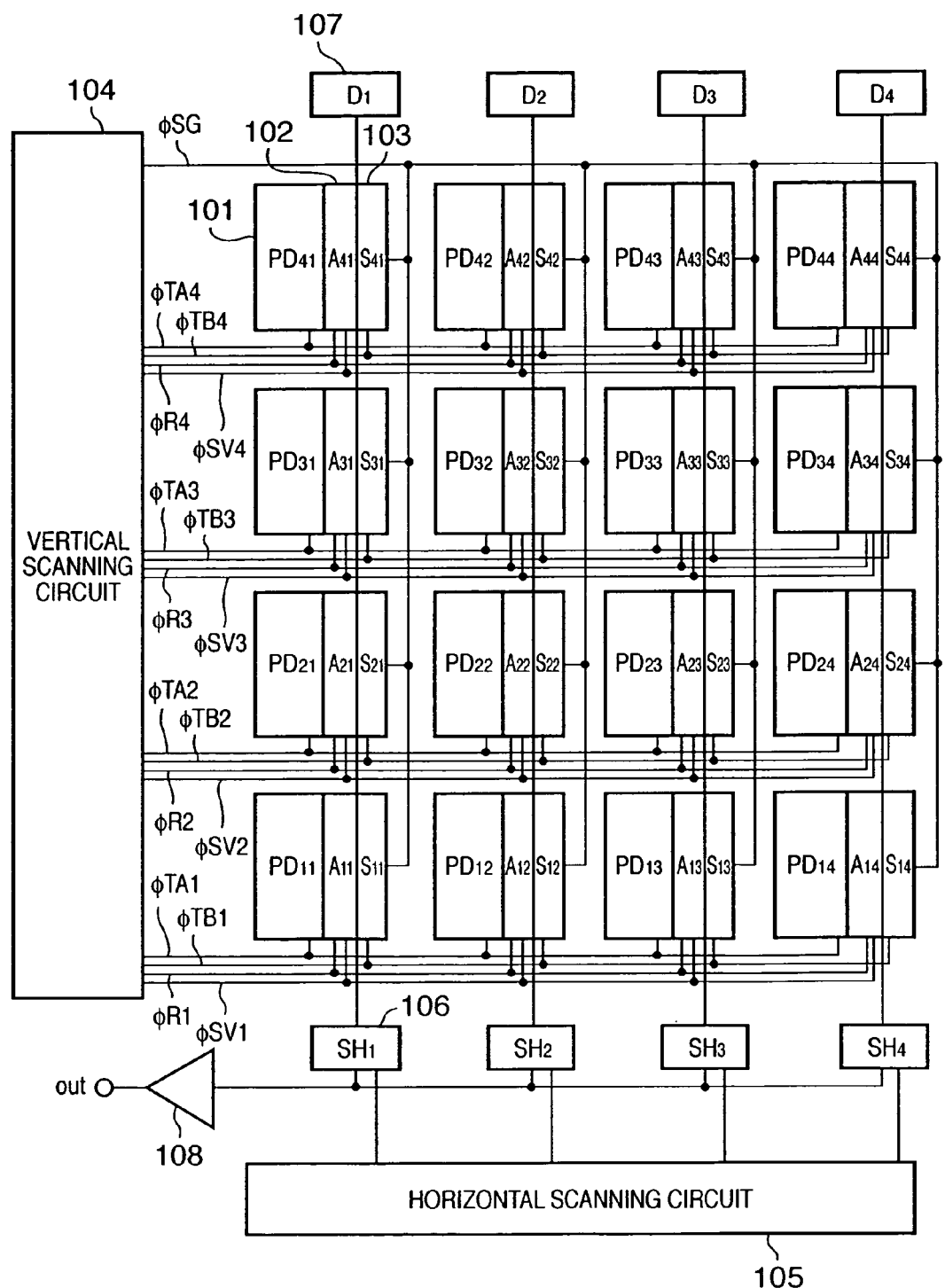
FIG. 1 is a diagram showing a configuration of a CMOS image sensor according to a first embodiment of the present invention.

FIG. 1 is a diagram showing a configuration of a CMOS image sensor according to a first embodiment of the present invention.

Referring to FIG. 1, reference numeral 101 denotes a photodiode which generates and accumulates a signal charge according to incident light; 102 denotes an output part; 103 denotes a storage part which temporarily holds the charge; 104 denotes a vertical scanning circuit for performing a selection of row direction to scan all rows; 105 denotes a horizontal scanning circuit for performing a selection of column direction to scan columns; 106 denotes a sample hold circuit which temporarily stores an image signal of a row selected by the vertical scanning circuit to allow the horizontal scanning circuit 105 to scan the image signal; 107 denotes a constant electric current source for driving the output part 102; 108 denotes an output amplifier for outputting to the outside of the image sensor the image signal stored in the sample hold circuit 106 and selected by the horizontal scanning circuit 105.

The charge transfer from the photodiode 101 to the output part 102 is controlled by transfer pulse φTAn (n=1, 2, ...); the charge transfer from the output part 102 to the storage part 103 is controlled by transfer pulse φTBn (n=1, 2, ...). φRn (n=1, 2, ...) denotes reset pulse for discharging unwanted charges accumulated in the photodiode 101, output part 102 and storage part 103. φSVn (n=1, 2, ...) denotes row selection pulse for reading a signal, i.e., selecting a row to cause the sample hold circuit 106 to store a signal. The potential of the storage part 103 is altered by control pulse φSG to enable switching of transfer direction of charges when transfer pulse φTBn is turned on, i.e., to enable a switchover between the transfer from the output part 102 to the storage part 103 and the transfer from the storage part 103 to the output part 102.

Figure 2:
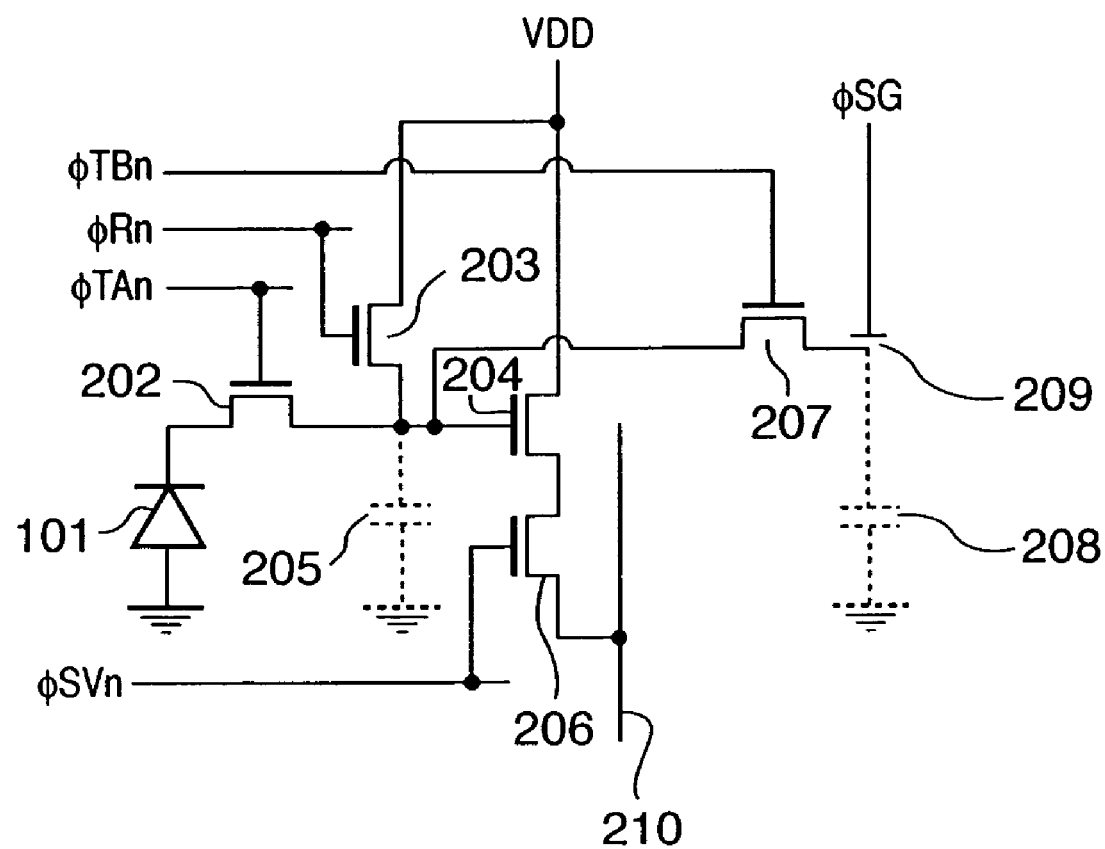
FIG. 2 is a diagram showing a pixel part of the image sensor according to the first embodiment.

FIG. 2 is a diagram showing one pixel constituting the image sensor of FIG. 1

Referring to FIG. 2, reference numeral 101 denotes a photodiode; 202 denotes a transfer gate for transferring charges from the photodiode 101 to a storage capacitor 205 of the output part 102 which is controlled by φTAn. Reference numeral 203 denotes a reset gate for discharging unwanted charges accumulated in the photodiode 101, output part 102 or storage part 103, the reset gate being controlled by reset pulse φRn. When the reset gate 203 is turned on, the unwanted charges are discharged to a power source VDD.

Reference numeral 204 denotes an MOS transistor being an amplification device for amplifying the signal charges of the storage capacitor 205 of the output part 102 and outputting it to a vertical output line 210 via a row selection switch 206. The row selection switch 206 is controlled by row selection pulse φSVn. Specifically, only a pixel whose row selection switch 206 is turned on outputs its image signal to the vertical output line 210. Reference numeral 207 denotes a transfer gate for transferring the signal charges of the storage capacitor 205 of the output part 102 to a storage capacitor 208 of the storage part 103, the transfer gate being controlled by transfer pulse φTBn. Reference numeral 209 denotes a control electrode which controls the potential of the storage capacitor 208 of the storage part 103.

FIGS. 3A to 3H are diagrams showing drive timing and potential in the pixel shown in FIG. 2. An electronic shutter operation according to the embodiment will be described with reference to FIGS. 2 and 3A to 3H.

Referring to FIGS. 3A to 3H, reference character PD denotes potential of the photodiode 101; reference character FD denotes potential of the storage capacitor 205 of the output part 102; reference character Memory denotes potential of the storage capacitor 208 of the storage part 103.

Firstly the electronic shutter operation, i.e., the operation from the initiation of accumulation of signal charges by the photodiode 101 to the transfer of the signal charges to the storage capacitor 208 of the storage part 103 will be described.

Figure 3A:
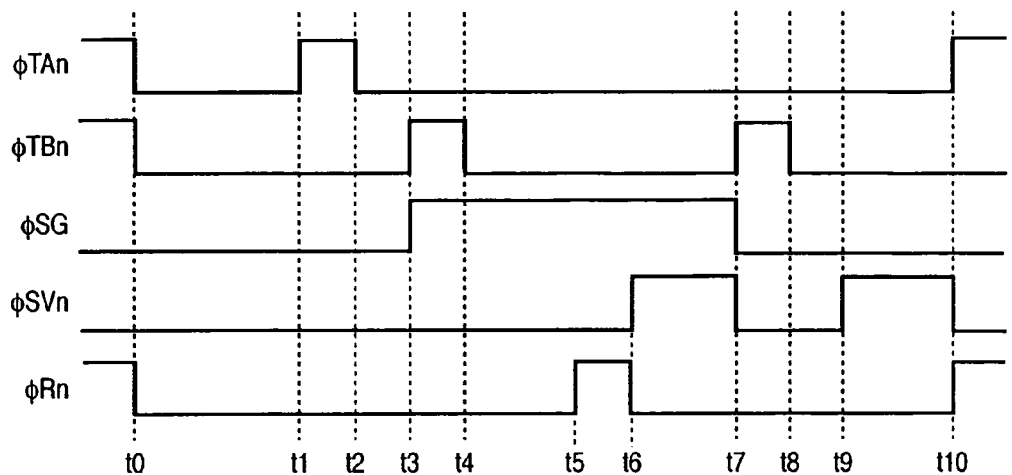
FIGS. 3A to 3H are diagrams showing drive timing and potential of the image sensor according to the first embodiment.
Figure 3B:
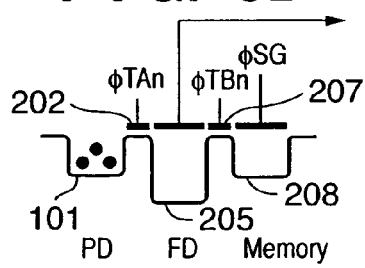

At time t0, transfer pulse φTAn is turned off to initiate the generation and accumulation of signal charges by the photodiode 101. FIG. 3B is a diagram showing potential observed during the time period of the generation and accumulation of signal charges. Before time t0, unwanted charges generated in the photodiode 101 are discharged via the reset gate 203.

Figure 3C:
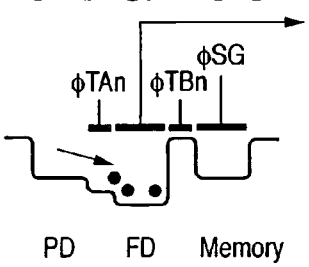

At time t1, transfer pulse φTAn is turned on to transfer the signal charges of the photodiode 101 to the storage capacitor 205 of the output part 102 with respect to all pixels of the image sensor. FIG. 3C is a diagram showing potential of this charge transfer. Referring to FIGS. 3A to 3H, simultaneously with the initiation of accumulation, i.e., with transfer pulse φTAn being turned off, transfer pulses φTBn and reset pulse φRn are turned off. However, if transfer pulses φTBn and reset pulse φRn remain on until just before φTAn is turned on, unwanted charges generated in the output part 102 and storage part 103 can be further reduced.

Figure 3D:
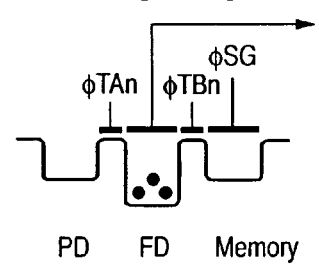

At time t2, transfer pulse φTAn is turned off to complete the charge transfer from the photodiode 101 to the storage capacitor 205 of the output part 102. FIG. 3D is a diagram showing potential at this time.

Figure 3E:
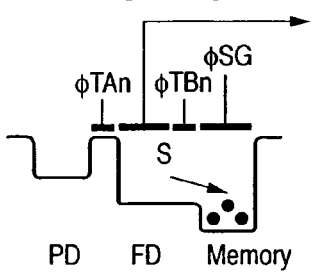

At time t3, transfer pulse φTBn is turned on, and control pulse φSG controlling potential of the storage part 208 of the storage part 103 is turned on, i.e., the potential of the storage part 208 of the storage part 103 is made lower than that of the storage capacitor 205 of the output part 102, whereby the charges can be transferred from the storage capacitor 205 to the storage capacitor 208. FIG. 3E is a diagram showing potential at this time.

Figure 3F:
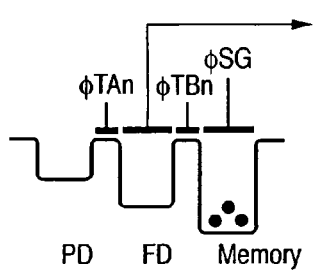

At time t4, transfer pulse φTBn is turned off to complete the charge transfer to the storage capacitor 208 of the storage part 103. FIG. 3F is a diagram showing potential at this time. The electronic shutter is implemented by the operation described until now. By performing this operation simultaneously for all rows, a uniform electronic shutter operation for the entire screen is performed. Since the outputting to the outside of the image sensor is not performed, the operation described until now can be performed in a relatively short time period. Accordingly, this operation may be performed sequentially for each row (each horizontal line). By utilizing a signal line of control pulse φSG as a light shielding member for the storage capacitor 208 of the storage part 103, unwanted light can be prevented from entering the storage capacitor 208. Also, the storage capacitor 208 is not disposed adjacent to the photodiode 101, so leakage of unwanted charges generated in the photodiode 101 into the storage capacitor 208 can be eliminated.

Next, the operation of reading signal charges from the storage capacitor 208 of the storage part 103 will be described.

While the operation for transferring the charges generated in the photodiode 101 to the storage capacitor 208 is performed simultaneously for all pixels of the image sensor or performed for each row as described above, the following operation is performed one row (one horizontal line) at a time for the image sensor. Now assume that the following operation is sequentially performed from the first row (n=1) to the nth row of the image sensor.

Firstly, at time t5, reset pulse φRn is turned on to discharge unwanted charges of the storage capacitor 205 of the output part 102, and is turned off immediately before time t6 to complete the discharge of unwanted charges.

Subsequently, at time t6, row selection pulse φSVn is turned on, whereby, with respect to the first row of pixels, a voltage (noise signal voltage) corresponding to a reset level of the storage capacitor 205 is outputted to the vertical output line 210, and the noise signal level of the first row is transferred to the sample hold circuit 106 (SH1, SH2 . . . ). Row selection pulse φSVn is turned off immediately before time t7.

Figure 3G:
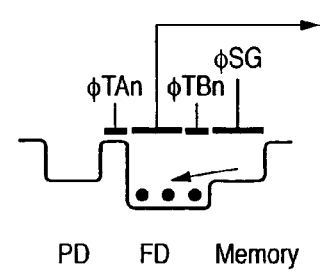

Subsequently, at time t7, control pulse φSG is turned off, and transfer pulse φTBn is turned on. FIG. 3G is a diagram showing potential at this time.

Figure 3H:
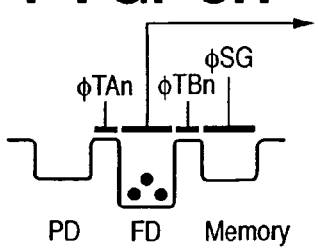

At time t8, transfer pulse φTBn is turned off to complete the charge transfer from the storage capacitor 208 of the storage part 103 to the storage capacitor 205 of the output part 102. FIG. 3H is a diagram showing potential at this time. In this state, the voltage of the storage capacitor 205 of each pixel of the first row is one obtained by adding the voltage of charge signal to the reset voltage (noise signal voltage).

Subsequently, at time t9, row selection pulse φSVn is turned on, whereby a voltage (noise signal voltage+charge signal voltage) corresponding to the voltage of the storage capacitor 205 of the output part 102 is outputted to the vertical output line 210. It is noted that a constant electric current source (not shown) is connected to the vertical output line 210. Then, (noise signal voltage+charge signal voltage) of the first row is transferred to the sample hold circuit 106 (SH1, SH2 . . . ). Each sample hold circuit 106 (SH1, SH2 . . . ) has two volumes; one is used for noise signal voltage, and the other is used for (noise signal voltage+charge signal voltage).

In the output amplifier 108, there is provided a difference circuit in which, based on the output of the sample hold circuit 106, there is made a calculation: (noise signal voltage+charge signal voltage)−(noise signal voltage), whereby the charge signal voltage can be read with the noise signal being eliminated. As described above, this read operation is performed for each row by use of row selection pulse; the operation for each row is repeated until all rows are completed.

With the image sensor of the present embodiment, when the electronic shutter operation is not performed, charges can also be transferred not to the storage part 103 but to the outside. Referring to FIGS. 3A to 3H, when transfer pulse φTBn and control pulse φSG are not turned on at time t3 and remain off, the operation for this case can be realized.

Second Embodiment

Next, a second embodiment of the present invention will be described.

Figure 4:
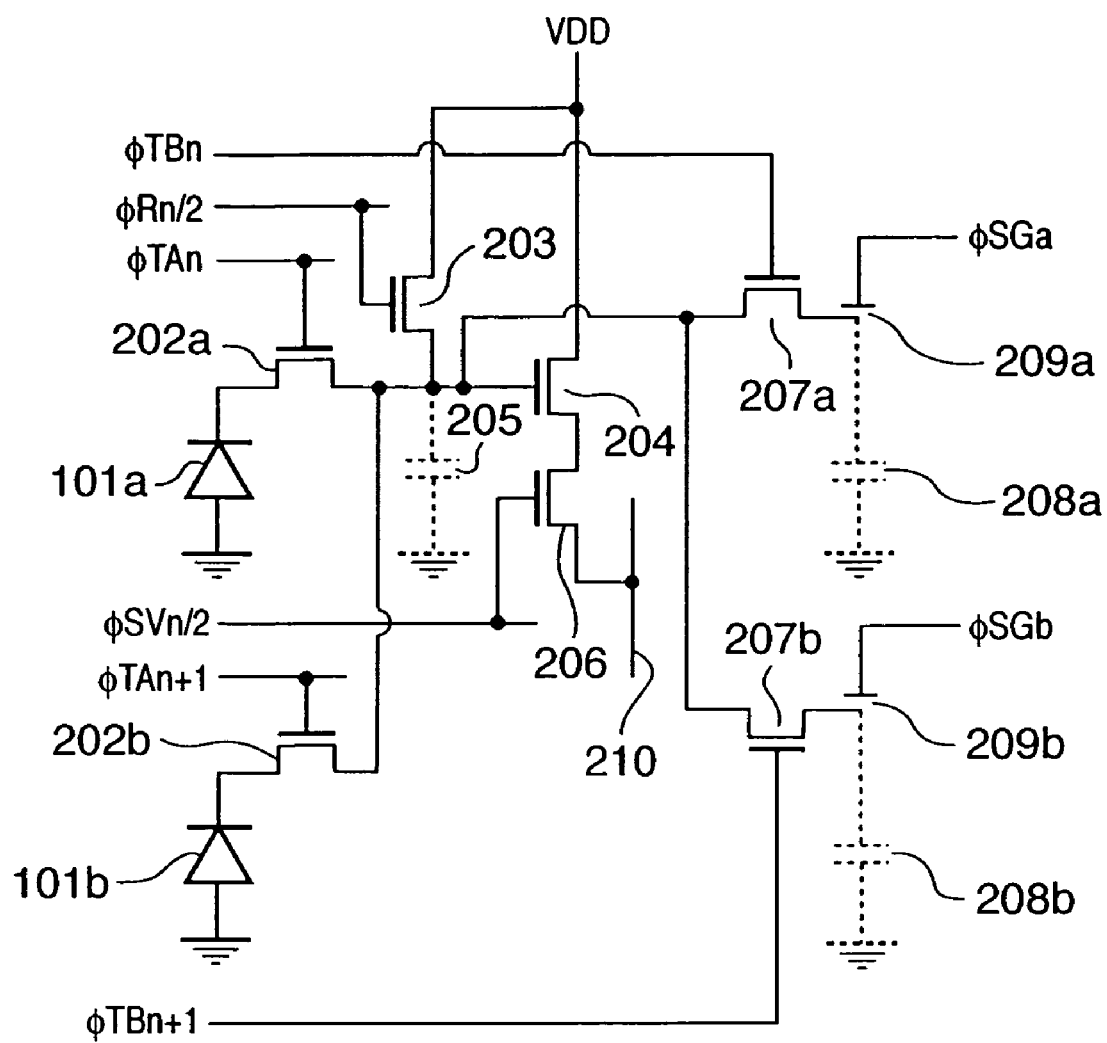
FIG. 4 is a diagram showing a pixel part of an image sensor according to a second embodiment.

FIG. 4 is a diagram illustrating two pixels constituting an image sensor according to a second embodiment. In FIG. 4, the same reference numerals are applied to parts corresponding to FIG. 2, and an explanation thereof is omitted.

Referring to FIG. 4, reference numerals 110a and 101b denote photodiodes. Reference numeral 202a denotes a transfer gate for transferring charges from the photodiode 110a to a storage capacitor 205 of an output part 102, the transfer gate being controlled by transfer pulse φTAn. Reference numeral 202b denotes a transfer gate for transferring charges from the photodiode 101b to the storage capacitor 205 of the output part 102, the transfer gate being controlled by transfer pulse φTAn+1. Reference numeral 207a denotes a transfer gate for transferring signal charges of the storage capacitor 205 of the output part 102 to a storage capacitor 208a of a storage part 103, the transfer gate being controlled by transfer pulse φTBn. Reference numeral 207b denotes a transfer gate for transferring signal charges of the storage capacitor 205 of the output part 102 to a storage capacitor 208b of the storage part 103, the transfer gate being controlled by transfer pulse φTBn+1. Reference numeral 209a denotes a control electrode controlling potential of the storage capacitor 208a of the storage part 103. Reference numeral 209b denotes a control electrode controlling potential of the storage capacitor 208b of the storage part 103. With the image sensor according to the present embodiment, an output part is shared by two pixels, thereby enabling reduction of the number of pixel constituent elements and furthermore, miniaturization of the image sensor, high integration, etc. An output part needs not to be shared by two pixels, but may be shared by many more pixels.

Figure 5:
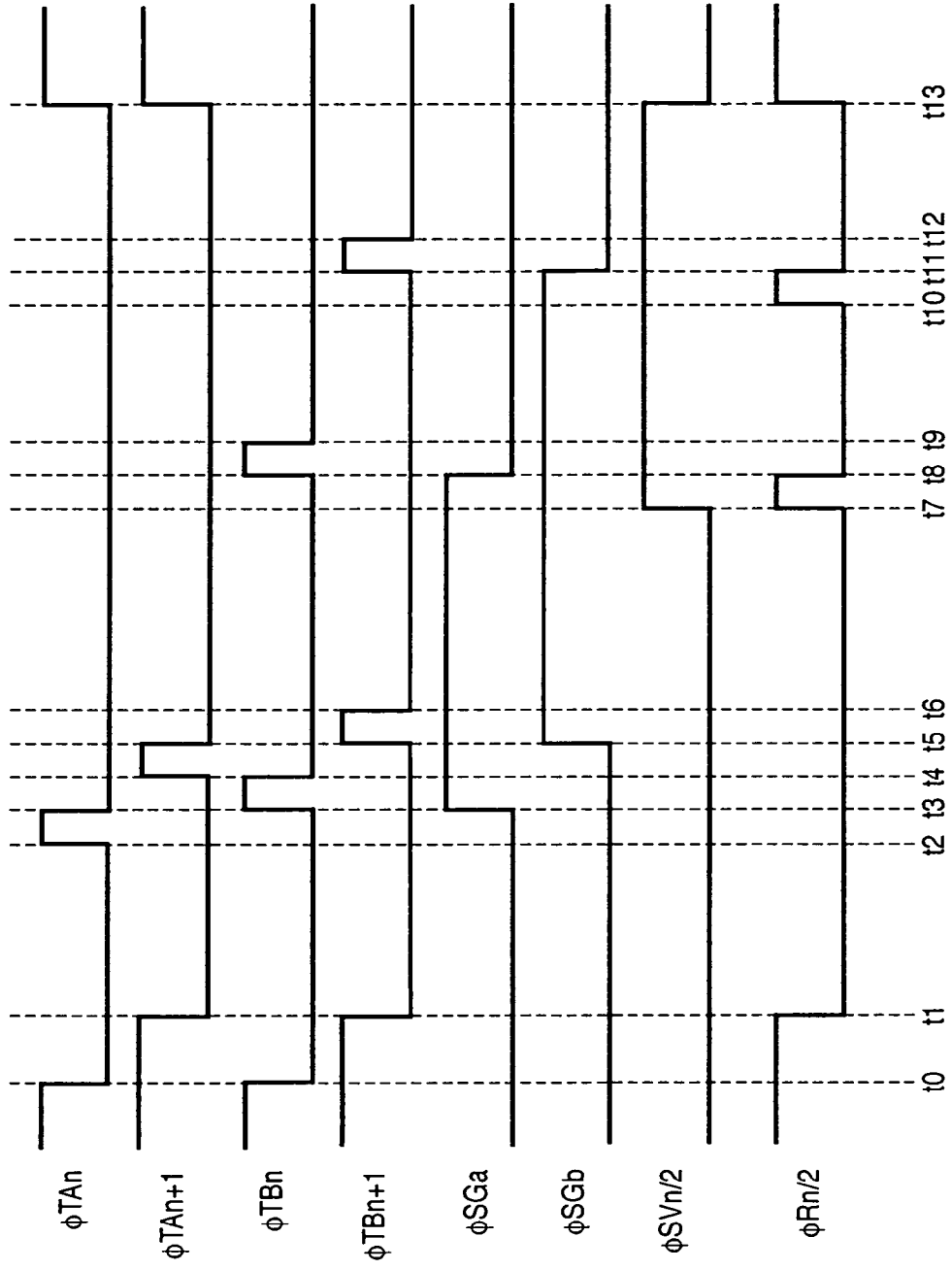
FIG. 5 is a diagram showing drive timing of the image sensor according to the second embodiment.

FIG. 5 is a diagram showing drive timing in the pixels of FIG. 4. An electronic shutter operation according to the second embodiment of the present invention will be described with reference to FIGS. 4 and 5.

Firstly the electronic shutter operation, i.e., the operation from the initiation of accumulation of signal charges by the photodiodes 110a and 101b to the transfer of the signal charges to the storage capacitors 208a and 208b of the storage part 103 will be described.

At time t0, transfer pulse φTAn is turned off to initiate the generation and accumulation of signal charges by the photodiode 110a. Before time t0, unwanted charges generated in the photodiode 110a are discharged via a reset gate 203.

At time t1, transfer pulse φTAn+1 is turned off to initiate the generation and accumulation of signal charges by the photodiode 101b. Before time t1, unwanted charges generated in the photodiode 101b are discharged via the reset gate 203.

At time t2, transfer pulse φTAn is turned on to transfer the signal charges of the photodiode 110a to the storage capacitor 205 of the output part. Referring to FIG. 5, simultaneously with the initiation of accumulation, i.e., with transfer pulse φTAn being turned off, transfer pulse φTBn is turned off, and simultaneously with transfer pulse φTAn being turned off, transfer pulse φTBn+1 and reset pulse φRn/2 are off. However, if transfer pulses φTBn and φTBn+1 and reset pulse φRn/2 remain on until just before φTAn is turned on, unwanted charges generated in the output part and storage part can be further reduced.

At time t3, transfer pulse φTAn is turned off to complete the charge transfer from the photodiode 101a to the storage capacitor 205 of the output part 102. Also, at time t3, transfer pulse φTBn is turned on, and control pulse φSGa controlling potential of the storage part 208a of the storage part 103 is turned on, i.e., the potential of the storage part 208a of the storage part 103 is made lower than that of the storage capacitor 205 of the output part 102, whereby the charges are transferred from the storage capacitor 205 to the storage capacitor 208a. At time t4, transfer pulse φTBn is turned off to complete the charge transfer to the storage capacitor 208a of the storage part 103.

Subsequently, charges are similarly transferred from the photodiode 101b to the storage capacitor 208 of the storage part 103. At time t4, transfer pulse φTAn+1 is turned on to transfer the signal charges of the photodiode 101b to the storage capacitor 205 of the output part 102. At time t5, transfer pulse φTAn+1 is turned off to complete the charge transfer from the photodiode 101b to the storage capacitor 205 of the output part 102. Also, at time t5, transfer pulse φTBn+1 is turned on, and control pulse φSGb controlling potential of the storage part 208b of the storage part 103 is turned on, i.e., the potential of the storage part 208b of the storage part 103 is made lower than that of the storage capacitor 205 of the output part 102, whereby the charges are transferred from the storage capacitor 205 to the storage capacitor 208b. At time t6, transfer pulse φTBn+1 is turned off to complete the charge transfer to the storage capacitor 208b of the storage part.

The electronic shutter is implemented by the operation described until now. By performing this operation simultaneously for all rows, a uniform electronic shutter operation for the entire screen is performed. Since the outputting to the outside of the image sensor is not performed, the operation described until now can be performed in a relatively short time period. Accordingly, this operation may be performed sequentially for each row.

Next, the operation of reading signal charges from the storage capacitors 208a and 208b of the storage part will be described.

While the operation for transferring the charges generated in the photodiodes 110a and 101b to the storage capacitors 208a and 208b is performed simultaneously for all pixels of the image sensor or performed for each row as described above, the following operation is performed one row (one horizontal line) at a time for the image sensor. Now assume that the following operation is sequentially performed from the first row (n=1) to the nth row of the image sensor. Note that, in the present embodiment, a horizontal sequence of pixels including the photodiodes 110a and 101b is counted as one row of the image sensor.

Firstly, at time t7, reset pulse φRn/2 is turned on to discharge unwanted charges of the storage capacitor 205 of the output part 102, and is turned off immediately before time t8 to complete the discharge of unwanted charges. Also, at time t7, row selection pulse φSVn/2 is turned on, whereby a voltage (noise signal voltage) corresponding to a reset level of the storage capacitor 205 of the first row (corresponding to the photodiode 110a) is outputted to the vertical output line 210, and the noise signal level is transferred to the sample hold circuit 106 (SH1, SH2 . . . ).

At time t8, control pulse φSGa is turned off, and transfer pulse φTBn is turned on. Consequently, the charges are transferred from the storage capacitor 208a of the storage part 103 to the storage capacitor 205 of the output part 102. At time t9, transfer pulse φTBn is turned off to complete the charge transfer from the storage capacitor 208a of the storage part 103 to the storage capacitor 205 of the output part 102. In this state, the voltage of the storage capacitor 205 of each pixel of the first row (corresponding to the photodiode 110a) is one obtained by adding the voltage of charge signal to the reset voltage (noise signal voltage). At this time, row selection pulse φSVn/2 is turned on, whereby a voltage (noise signal voltage+charge signal voltage) corresponding to the voltage of the storage capacitor 205 of the output part 102 is outputted to the vertical output line 210. It is noted that a constant electric current source (not shown) is connected to the vertical output line 210.

Next, (noise signal voltage+charge signal voltage) of the first row (corresponding to the photodiode 110a) is transferred to the sample hold circuit 106 (SH1, SH2 . . . ). Each sample hold circuit 106 (SH1, SH2 . . . ) has two volumes; one is used for noise signal voltage, and the other is used for (noise signal voltage+charge signal voltage).

In the output amplifier 108, there is provided a difference circuit in which, based on the output of the sample hold circuit 106, there is made a calculation: (noise signal voltage+charge signal voltage)−(noise signal voltage), whereby the charge signal voltage (corresponding to the photodiode 110a) can be read with the noise signal being eliminated.

After the output signal of the first row (corresponding to the photodiode 110a) is read to the outside of the image sensor in this way, the signal charges existing in the storage capacitor 208b of the storage part are similarly read.

Firstly, at time t10, reset pulse φRn/2 is turned on to discharge unwanted charges of the storage capacitor 205 of the output part 102, and is turned off immediately before time t11 to complete the discharge of unwanted charges. Also, at time t10, row selection pulse φSVn/2 is turned on, whereby a voltage (noise signal voltage) corresponding to a reset level of the storage capacitor 205 of the first row (corresponding to the photodiode 101b) is outputted to the vertical output line 210, and the noise signal level is transferred to the sample hold circuit 106 (SH1, SH2 . . . ).

Subsequently, at time t11, control pulse φSGb is turned off, and transfer pulse φTBn+1 is turned on. Consequently, the charges are transferred from the storage capacitor 208b of the storage part 103 to the storage capacitor 205 of the output part 102.

At time t12, transfer pulse φTBn+1 is turned off to complete the charge transfer from the storage capacitor 208b of the storage part 103 to the storage capacitor 205 of the output part.

In this state, the voltage of the storage capacitor 205 of each pixel of the first row (corresponding to the photodiode 101b) is one obtained by adding the voltage of charge signal to the reset voltage (noise signal voltage). At this time, row selection pulse φSVn/2 is turned on, whereby a voltage (noise signal voltage+charge signal voltage) corresponding to the voltage of the storage capacitor 205 of the output part 102 is outputted to the vertical output line 210.

Next, (noise signal voltage+charge signal voltage) is transferred to the sample hold circuit 106 (SH1, SH2 . . . ). Each sample hold circuit 106 (SH1, SH2 . . . ) has two volumes; one is used for noise signal voltage, and the other is used for (noise signal voltage+charge signal voltage).

In the output amplifier 108, there is provided a difference circuit in which, based on the output of the sample hold circuit 106, there is made a calculation: (noise signal voltage+charge signal voltage)−(noise signal voltage), whereby the charge signal voltage (corresponding to the photodiode 101b) can be read with the noise signal being eliminated.

By sequentially performing this operation, the output signal of all pixels of the image sensor can be read to the outside of the image sensor. With the present embodiment, two control pulses φSGa and φSGb are used to control independently the storage capacitors 208a and 208b of the storage part 103. However, a single control pulse may be shared and remain on from time t3 to time t11.

Third Embodiment

Next, a third embodiment of the present invention will be described.

FIGS. 6A to 6F are diagrams showing drive timing and potential of an image sensor according to the third embodiment. An electronic shutter operation of the third embodiment will be described with reference to FIGS. 2 and 6A to 6F. Referring to FIGS. 6A to 6F, reference character PD denotes potential of the photodiode 101; reference character FD denotes potential of the storage capacitor 205 of the output part 102; reference character Memory denotes potential of the storage capacitor 208 of the storage part 103.

Firstly the electronic shutter operation, i.e., the operation from the initiation of accumulation of signal charges by the photodiode 101 to the transfer of the signal charges to the storage capacitor 208 of the storage part 103 will be described.

Figure 6A:
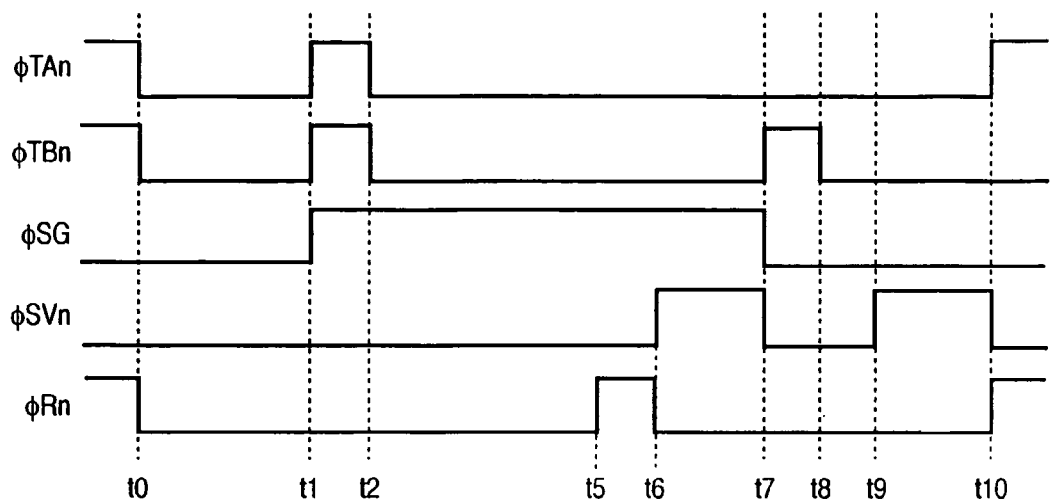
FIGS. 6A to 6F are diagrams showing drive timing and potential of the image sensor according to the third embodiment.
Figures 6B, 6C, 6D:
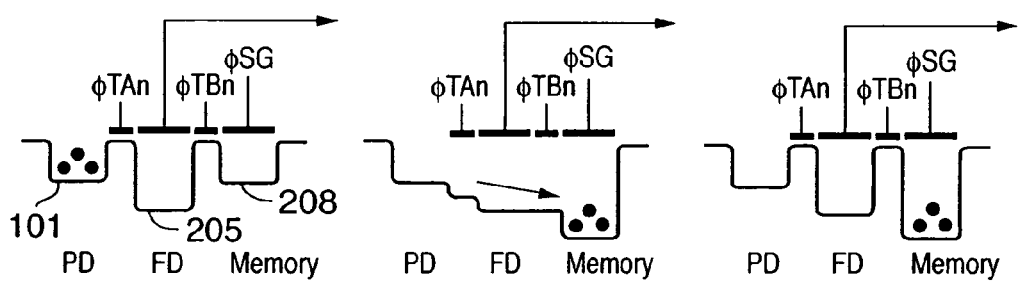

At time t0, transfer pulse φTAn is turned off to initiate the generation and accumulation of signal charges by the photodiode 101. FIG. 6B is a diagram showing potential observed during the time period of the generation and accumulation of signal charges. Before time t0, unwanted charges generated in the photodiode 101 are discharged via the reset gate 203.

At time t1, transfer pulse φTAn is turned on, and transfer pulse φTBn and control pulse φSG are simultaneously turned on. The signal charges of the photodiode 101 are transferred to the storage capacitor 208 of the storage part 103 via the storage capacitor 205 of the output part 102. FIG. 6C is a diagram showing potential of this charge transfer. Referring to FIGS. 6A to 6F, simultaneously with the initiation of accumulation, i.e., with transfer pulse φTAn being turned off, transfer pulse φTBn and reset pulse φRn are turned off. However, if, with transfer pulse φTBn being on, reset pulse φRn remains on until just before φTAn is turned on at time t1, unwanted charges generated in the output part 102 and storage part 103 can be further reduced.

At time t2, transfer pulses φTAn and φTBn are turned off to complete the charge transfer from the photodiode 101 to the storage capacitor 208 of the storage part 103. FIG. 6D is a diagram showing potential at this time. The electronic shutter is implemented by the operation described until now. By performing this operation simultaneously for all rows, a uniform electronic shutter operation for the entire screen is performed. Since the outputting to the outside of the image sensor is not performed, the operation described until now can be performed in a relatively short time period. Accordingly, this operation may be performed sequentially for each row.

Next, the operation of reading the signal charges from the storage capacitor 208 of the storage part will be described. This read operation is similar to that of the first embodiment.

Specifically, at time t5, reset pulse φRn is turned on to discharge unwanted charges of the storage capacitor 205 of the output part 102, and is turned off immediately before time t6 to complete the discharge of unwanted charges.

Subsequently, at time t6, row selection pulse φSVn is turned on, whereby, with respect to the first row of pixels, a voltage (noise signal voltage) corresponding to a reset level of the storage capacitor 205 is outputted to the vertical output line 210, and the noise signal level of the first row is transferred to the sample hold circuit 106 (SH1, SH2 . . . ). Row selection pulse φSVn is turned off immediately before time t7.

Figures 6E, 6F:
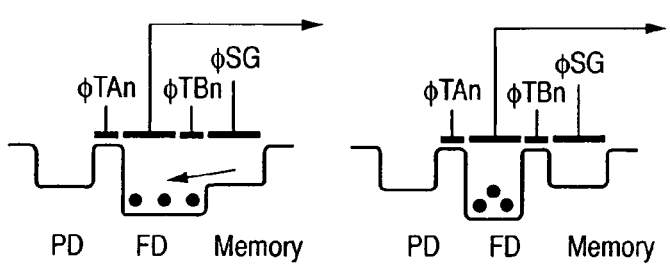

Subsequently, at time t7, control pulse φSG is turned off, and transfer pulse φTBn is turned on. FIG. 6E is a diagram showing potential at this time.

At time t8, transfer pulse φTBn is turned off to complete the charge transfer from the storage capacitor 208 of the storage part 103 to the storage capacitor 205 of the output part 102. FIG. 6F is a diagram showing potential at this time. In this state, the voltage of the storage capacitor 205 of each pixel of the first row is one obtained by adding the voltage of charge signal to the reset voltage (noise signal voltage).

Subsequently, at time t9, row selection pulse φSVn is turned on, whereby a voltage (noise signal voltage+charge signal voltage) corresponding to the voltage of the storage capacitor 205 of the output part 102 is outputted to the vertical output line 210. It is noted that a constant electric current source (not shown) is connected to the vertical output line 210. Then, (noise signal voltage+charge signal voltage) of the first row is transferred to the sample hold circuit 106 (SH1, SH2 . . . ). Each sample hold circuit 106 (SH1, SH2 . . . ) has two volumes; one is used for noise signal voltage, and the other is used for (noise signal voltage+charge signal voltage).

In the output amplifier 108, there is provided a difference circuit in which, based on the output of the sample hold circuit 106, there is made a calculation: (noise signal voltage+charge signal voltage)−(noise signal voltage), whereby the charge signal voltage can be read with the noise signal being eliminated. As described above, this read operation is performed for each row by use of row selection pulse; the operation for each row is repeated until all rows are completed.

With the third embodiment described above, the drive can be simplified, thus making it possible to shorten the time period required for the transfer. In the third embodiment, a case where the image sensor structure of the first embodiment is employed has been described. However, the similar drive is also possible in an image sensor according to the second embodiment, i.e., in an image sensor in which an output part is shared by multiple pixels.

Fourth Embodiment

Next, a fourth embodiment of the present invention will be described.

FIGS. 7A to 7H are diagrams showing drive timing and potential of an image sensor according to the fourth embodiment. An electronic shutter operation of the fourth embodiment will be described with reference to FIGS. 2 and 7A to 7H. Referring to FIGS. 7A to 7H, reference character PD denotes potential of the photodiode 101; reference character FD denotes potential of the storage capacitor 205 of the output part 102; reference character Memory denotes potential of the storage capacitor 208 of the storage part 103.

Firstly the electronic shutter operation, i.e., the operation from the initiation of accumulation of signal charges by the photodiode 101 to the transfer of the signal charges to the storage capacitor 208 of the storage part 103 will be described.

At time t0, transfer pulse φTAn is turned off to initiate the generation and accumulation of signal charges by the photodiode 101. FIG. 7B is a diagram showing potential observed during the time period of the generation and accumulation of signal charges. Before time t0, unwanted charges generated in the photodiode 101 are discharged via the reset gate 203.

At time t1, transfer pulse φTAn is turned on to transfer the signal charges of the photodiode 101 to the storage capacitor 205 of the output part 102. FIG. 7C is a diagram showing potential of this charge transfer. Referring to FIGS. 7A to 7H, simultaneously with the initiation of accumulation, i.e., with transfer pulse φTAn being turned off, transfer pulse φTBn and reset pulse φRn are turned off. However, if transfer pulse φTBn and reset pulse φRn remain on until just before φTAn is turned on at time t1, unwanted charges generated in the output part 102 and storage part 103 can be further reduced.

At time t2, transfer pulses φTAn is turned off to complete the charge transfer from the photodiode 101 to the storage capacitor 205 of the output part 102. FIG. 7D is a diagram showing potential at this time. Also, at time t2, row selection pulse φSVn is turned on, whereby an output signal proportional to the amount of charges existing in the storage capacitor 205 of the output part 102 is outputted to the vertical output line 210. Accordingly, monitoring of the signal output is possible.

At time t3, transfer pulse φTBn is turned on, and control pulse φSG controlling potential of the storage part 208 of the storage part 103 is turned on, i.e., the potential of the storage part 208 of the storage part 103 is made lower than that of the storage capacitor 205 of the output part 102, whereby the charges can be transferred from the storage capacitor 205 to the storage capacitor 208. FIG. 7E is a diagram showing potential at this time.

At time t4, transfer pulse φTBn is turned off to complete the charge transfer to the storage capacitor 208 of the storage part 103. FIG. 7F is a diagram showing potential at this time.

The electronic shutter is implemented by the operation described until now. With the drive according to the present embodiment, the signal charges generated in the photodiode 101 can be monitored before a read operation described later is performed; this can be applied to, for example, an AE control by which an optimum exposure is obtained for an object. In this case, for example, the operation from time t0 to time t4 in FIGS. 7A to 7H is repeated, and when the accumulated output signal thus monitored exceeds a predetermined value, a shift is made to the read operation. This monitoring operation may be performed for the entire image sensor, or only for part of the image sensor. In the latter case, the drive method according to the first embodiment is employed for the rows for which the monitoring operation is not performed.

Next, the operation of reading the signal charges from the storage capacitor 208 of the storage part 103 will be described.

Firstly, at time t5, reset pulse φRn is turned on to discharge unwanted charges of the storage capacitor 205 of the output part 102, and is turned off immediately before time t6 to complete the discharge of unwanted charges.

Subsequently, at time t6, row selection pulse φSVn is turned on, whereby, with respect to the first row of pixels, a voltage (noise signal voltage) corresponding to a reset level of the storage capacitor 205 is outputted to the vertical output line 210, and the noise signal level of the first row is transferred to the sample hold circuit 106 (SH1, SH2 . . . ). Row selection pulse φSVn is turned off at time t7.

Subsequently, at time t7, control pulse φSG is turned off, and transfer pulse φTBn is turned on. FIG. 7G is a diagram showing potential at this time.

At time t8, transfer pulse φTBn is turned off to complete the charge transfer from the storage capacitor 208 of the storage part 103 to the storage capacitor 205 of the output part 102. FIG. 7H is a diagram showing potential at this time. In this state, the voltage of the storage capacitor 205 of each pixel of the first row is one obtained by adding the voltage of charge signal to the reset voltage (noise signal voltage).

Subsequently, at time t9, row selection pulse φSVn is turned on, whereby a voltage (noise signal voltage+charge signal voltage) corresponding to the voltage of the storage capacitor 205 of the output part 102 is outputted to the vertical output line 210. It is noted that a constant electric current source (not shown) is connected to the vertical output line 210. Then, (noise signal voltage+charge signal voltage) of the first row is transferred to the sample hold circuit 106 (SH1, SH2 . . . ). Each sample hold circuit 106 (SH1, SH2 . . . ) has two volumes; one is used for noise signal voltage, and the other is used for (noise signal voltage+charge signal voltage).

In the output amplifier 108, there is provided a difference circuit in which, based on the output of the sample hold circuit 106, there is made a calculation: (noise signal voltage+charge signal voltage)−(noise signal voltage), whereby the charge signal voltage can be read with the noise signal being eliminated. As described above, this read operation is performed for each row by use of row selection pulse; the operation for each row is repeated until all rows are completed.

Fifth Embodiment

Next, there will be described an image capturing system in which the image capturing apparatus according to the first to fourth embodiments is applied to a digital still camera.

Figure 8:
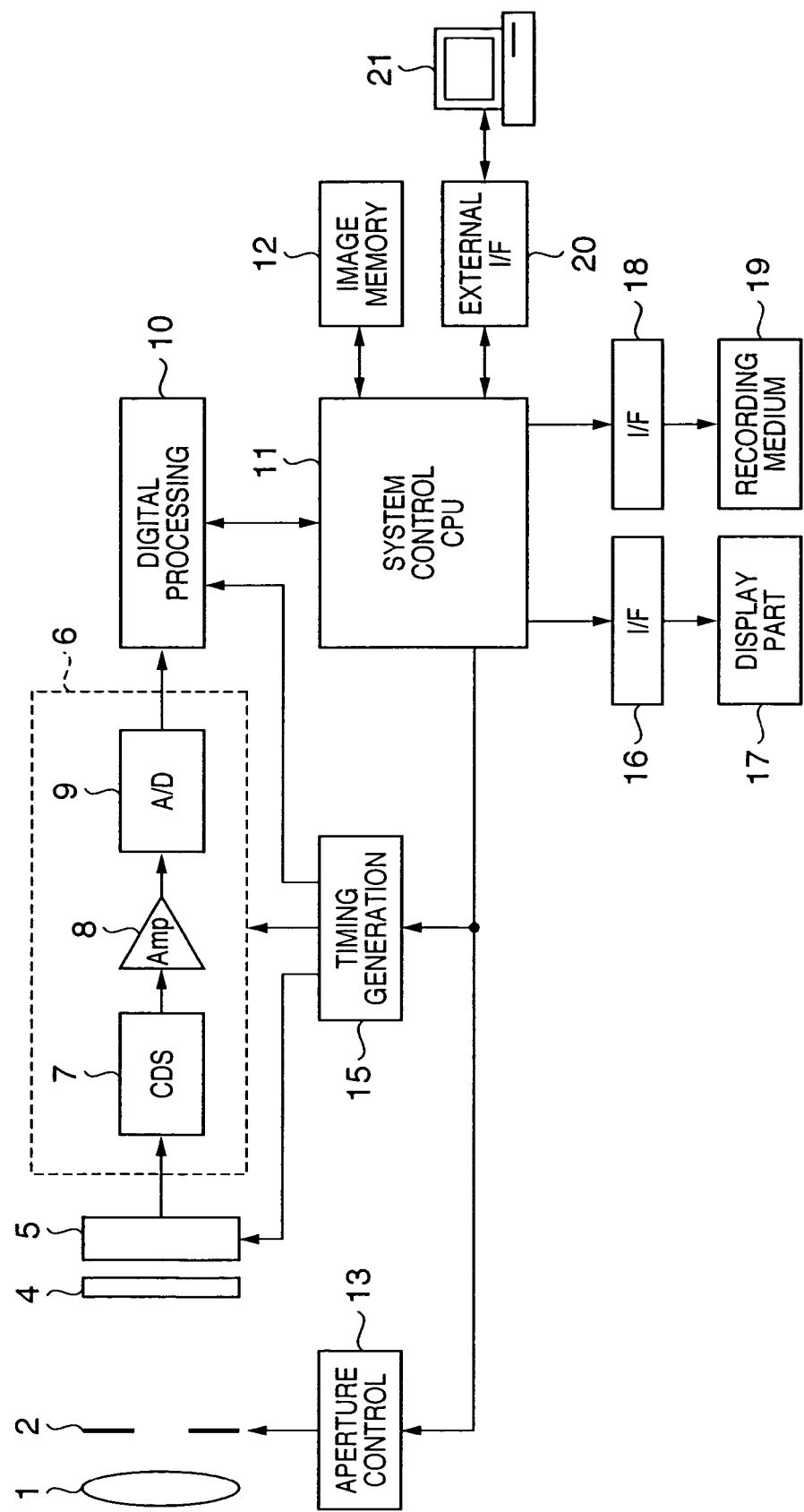
FIG. 8 is a block diagram showing a configuration of a digital camera to which the image capturing apparatus according to the first to fourth embodiments is applied.
Figure 9:
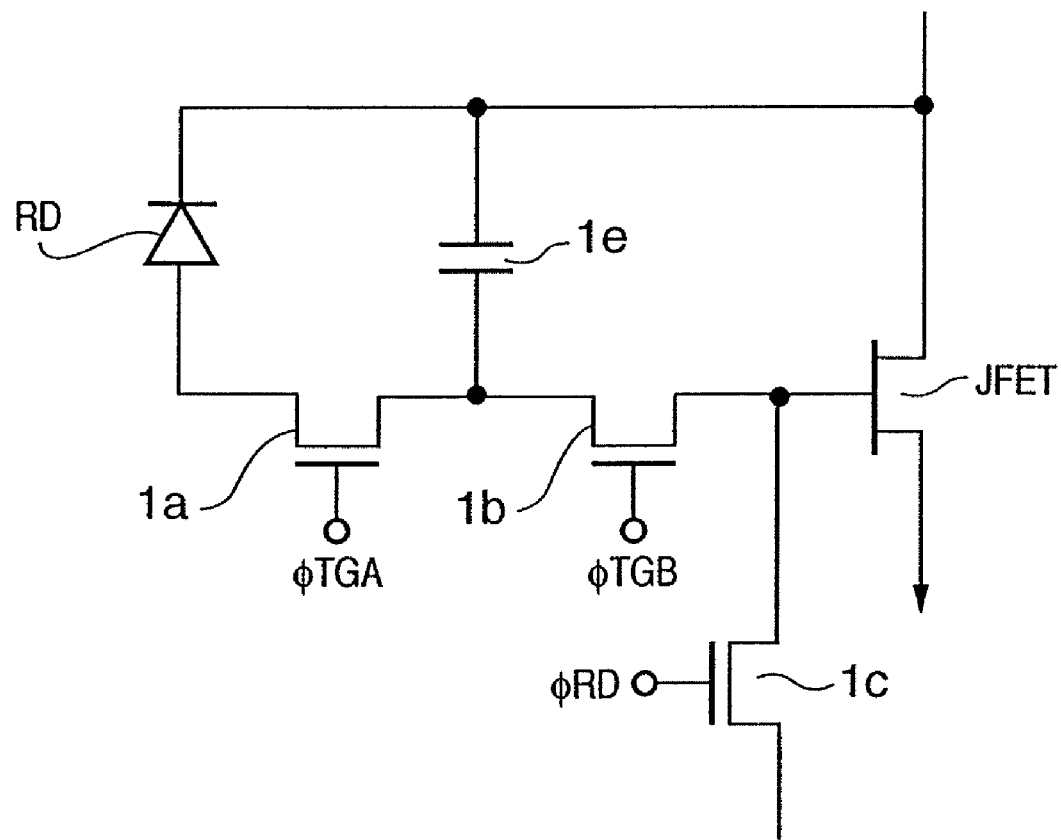
FIG. 9 is a diagram showing a configuration of a pixel part of a conventional image sensor.

FIG. 8 is a block diagram showing a configuration of a digital still camera according to the present embodiment.

Referring to FIG. 8, reference numeral 1 denotes a lens which provides an object optical image to an image sensor 5. Reference numeral 2 denotes an aperture for adjusting the amount of light passing through the lens 1; the aperture is controlled by an aperture control part 13. Reference numeral 4 denotes an optical filter which limits the wavelength or spatial frequency of light incident to the image sensor 5. Reference numeral 5 denotes the image sensor for capturing the object image provided by the lens 1 as an image signal. Reference numeral 6 denotes an analog front end which performs the analog processing and analog-to-digital conversion of image signal outputted from the image sensor 5. The analog front end 6 includes a CDS circuit 7 eliminating noises, an amplifier 8 adjusting the signal gain, and an A/D converter 9 converting an analog signal into a digital signal. Reference numeral 10 denotes a digital signal processing part which performs various corrections and data compression on the digital image data outputted from the analog front end 6. Reference numeral 15 denotes a timing generation part which outputs various timing signals to the image sensor 5, analog front end 6 and digital signal processing part 10. Reference numeral 11 denotes a system control CPU which controls various operations and the entire digital still camera. Further, reference numeral 12 denotes an image memory for temporarily storing image data; 16 denotes a display interface part for displaying captured images; 17 denotes a display part such as a liquid crystal display; 18 denotes a recording interface part for recording or reading image data to/from a recording medium; 19 denotes a detachable recording medium, such as a semiconductor memory, for recording or reading image data; 20 denotes an external interface part for communicating with an external computer 21 or the like. The image sensor 5 is identical to the image sensor described in any one of the first to fourth embodiments, and is driven by any one of the drive timings according to the first to fourth embodiments.

Next, there will be described the operation of the digital still camera having the above mentioned configuration when a photograph is taken.

When a power supply switch (not shown) is turned on, a main power supply is turned on, and then a power supply of control system is turned on. Further, power supplies of image capturing system circuits, such as the analog front end 6, are turned on.

Subsequently, in order to control the exposure, the system control CPU 11 opens the aperture 2 via the aperture control part 13. A signal outputted from the image sensor 5 is processed in the analog front end 6 and then inputted to the digital signal processing part 10. Based on the data, the exposure operation is performed in the system control CPU 11.

The brightness is determined from the result of the photometric operation. The system control CPU 11 controls the aperture 2 according to the determination result.

Next, based on the signal outputted from the image sensor 5, high frequency components are extracted, whereby the system control CPU 11 performs the operation of measuring the distance from the object. Subsequently, the lens is driven to determine whether or not the lens is in focus. If not, the lens is driven again to perform the distance measurement.

After it is confirmed that the lens is in focus, the initiation and termination of the actual exposure are performed by use of the electronic shutter function of the image sensor 5. This electronic shutter operation is performed by use of any one of the methods described in the first to fourth embodiments. Then, the image signals are sequentially outputted for each row. The image signal outputted from the image sensor 5 is subjected to noise reduction, such as correlation double sampling, and amplification and A/D conversion in the analog front end 6. The digitized image signal passes through the digital signal processing part 10 and is written into the image memory 12 by the system control CPU 11. Subsequently, the image data stored in the image memory 12 is recorded onto the detachable recording medium 19, such as a semiconductor memory, via the recording interface part 18 by the control from the system control CPU 11. Also, the captured image data is displayed on the display part 17, such as a liquid crystal display, via the display interface part 16. Alternatively, the captured image data may be inputted directly to the computer 21 or the like so that image processings are applied to the data.

As described above, with the above mentioned embodiments, the electronic shutter operation is possible in which the leakage and generation of unwanted charges are reduced during a time period when the storage part holds charges. Further, it is possible to simplify the drive when the electronic shutter operation is not performed.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2004-231427 filed on Aug. 6, 2004, which is hereby incorporated by reference herein.

What is claimed is:

1. An image capturing apparatus comprising:

a plurality of pixels arranged in a two-dimensional manner, each of the plurality of pixels including a photo-electric conversion device which generates and accumulates a signal according to the amount of light from an object, an output device which outputs a signal, outputted from the photo-electric conversion device, to the outside of the pixel, a storage device which temporarily stores the signal, a first transfer device which transfers the signal outputted from the photo-electric conversion device to a storage capacitor of the output device, and a second transfer device which transfers the signal of the storage capacitor of the output device to the storage device and transfers the signal of the storage device to the storage capacitor of the output device; and a drive circuit which transfers the signal outputted from the photo-electric conversion device to the storage device of the output device by the first transfer device, and transfers the signal of the storage capacitor of the output device to the storage device by the second transfer device, and then transfers the signal from the storage device to the storage capacitor of the output device by the second transfer device, wherein, when the signal outputted from the photo-electric conversion device is transferred to the output device, the drive circuit outputs at least part of the signal from the output device to the outside, and then transfers the signal from the storage capacitor of the output device to the storage device.

2. The image capturing apparatus according to claim 1, wherein the drive circuit performs the transfer of a signal from the photo-electric conversion device to the output device, and the transfer of a signal from the storage capacitor of the output device to the storage device simultaneously for the pixels of the image capturing apparatus arranged in a two-dimensional manner, and after the transfer of a signal from the photo-electric conversion device to the storage device, the drive circuit reads the signal to the outside of the pixel one row at a time, thereby controlling the exposure time of the photo-electric conversion device.

3. The image capturing apparatus according to claim 1, further comprising a potential varying device for varying the charge storage potential of the storage device, wherein the charge storage potential of the storage device is varied by the potential varying device to perform a switchover between the transfer from the output device to the storage device and the transfer from the storage device to the storage capacitor of the output device.

4. The image capturing apparatus according to claim 1, wherein the output device can be shared by two or more of the photo-electric conversion devices.

5. The image capturing apparatus according to claim 1, wherein the drive circuit does not transfer the signal transferred from the photo-electric conversion device to the output device but outputs the signal to the outside of the pixel.

6. The image capturing apparatus according to claim 1, wherein the drive circuit performs the transfer of a signal from the photo-electric conversion device to the output device, and the transfer of a signal from the output device to the storage device are performed simultaneously for the pixels of the image capturing apparatus, and after the transfer of a signal from the photo-electric conversion device to the storage device of the output device by the first transfer device, the drive circuit firstly resets the storage capacitor of the output device, and reads a first signal obtained in the output device after the reset to the outside of the pixel; and secondly transfers the signal of the storage device to the output device, and reads a second signal obtained in the output device to the outside of the pixel.

* * * * *